United States Patent
Brillhart

(10) Patent No.: US 6,183,796 B1
(45) Date of Patent: Feb. 6, 2001

(54) MONOUNSATURATED FATTY ACID COMPOSITIONS AND METHOD OF MAKING

(75) Inventor: Donald D. Brillhart, Marshall, TX (US)

(73) Assignee: Lipotech Partners Limited Partnership, Cleveland, OH (US)

( * ) Notice: Under 35 U.S.C. 154(b), the term of this patent shall be extended for 0 days.

(21) Appl. No.: 09/399,020

(22) Filed: Sep. 20, 1999

(51) Int. Cl.$^7$ ........................................ A23D 9/00
(52) U.S. Cl. ..................... 426/417; 426/601; 426/641
(58) Field of Search .................... 426/417, 601, 426/641

(56) References Cited

U.S. PATENT DOCUMENTS

| | | | |
|---|---|---|---|
| 4,331,695 | * | 5/1982 | Zosel ..................... 426/417 |
| 4,480,993 | * | 11/1984 | Gueriec ................. 426/417 |
| 4,567,050 | * | 1/1986 | Roth ..................... 426/417 |
| 4,645,676 | * | 2/1987 | Nakazono ............. 426/417 |
| 4,656,137 | * | 4/1987 | Balassa ................. 435/267 |
| 4,847,099 | * | 7/1989 | Elinsky ................. 426/233 |
| 5,149,550 | * | 9/1992 | Mohelef ................. 426/417 |
| 5,198,250 | | 3/1993 | Brillhart et al. ........ 426/2 |
| 5,405,632 | * | 4/1995 | Mahboob ............... 426/417 |
| 5,725,897 | * | 3/1998 | Schaefer ............... 426/417 |
| 5,965,184 | * | 10/1999 | Schaefer ............... 426/417 |

OTHER PUBLICATIONS

Huei 1996 Baileys Industrial Oil and Fat Products 5$^{th}$ edition vol. 1 John Wiley & Sons Inc, New York, p 3,5–7.*

* cited by examiner

Primary Examiner—Carolyn Paden
(74) Attorney, Agent, or Firm—Wood, Herron & Evans, L.L.P.

(57) ABSTRACT

Monounsaturated fatty acid compositions are made by heating isolated lower limbs of cattle in the presence of an effective amount of water and separating the oil produced to form a lipid composition enriched in C14:1 monounsaturated fatty acids. C16:1 monounsaturated fatty acids are also contained in the lipid composition with low levels of both saturated fatty acids and higher chain, i.e., C20–C22 fatty acids.

13 Claims, No Drawings

MONOUNSATURATED FATTY ACID COMPOSITIONS AND METHOD OF MAKING

FIELD OF THE INVENTION

The present invention pertains to monunsaturated fatty acid compositions and a method of making or concentrating them employing natural source materials. In particular, the method involves the use of isolated lower limbs of cattle to provide natural lipid compositions enriched in C14:1 monounsaturated fatty acids.

BACKGROUND OF THE INVENTION

In U.S. Pat. No. 5,198,250, food and pharmaceutical compositions containing short chain monounsaturated fatty acids (MUFAs) and methods of using them are disclosed. In particular, as set forth in detail in that patent, MUFA compositions were formulated to produce beneficial improvements in the metabolic processing of lipids or glucose in animals to which the compositions of matter are regularly administered. Beneficial improvements in the metabolic processing of lipids are evidenced by different effects in various tissues. Generally, the metabolic processing of lipids may include any or all steps in the metabolic pathways which include, in part, lipid uptake from dietary sources, hydrolysis, esterification of fatty acids to produce other lipid species, packaging of lipids into lipoproteins, lipid transport, lipid storage in tissues, lipid or lipoprotein cellular uptake, lipid synthesis, enzymatic modification and catabolism, and pathological lipid deposition in arteries, liver, heart and in adipose tissue. As set forth in the disclosure of that patent in detail, regular or systematic administration of the formulated MUFA compositions provide beneficial improvements in metabolic processing.

Monounsaturated fatty acids which occur naturally have been asserted to provide beneficial effects. Macadamia nuts, for example, are a significant natural raw palmitoleic material from which to isolate palmitoleic acid triglycerides (C16:1). Macadamia nuts contain high levels of palmitoleic acid, which comprises in excess of 19% of the fatty acid composition of macadamia nut oil. In addition, the other fatty acids of macadamia nut oil are closely similar in both identity and quantity to those present in olive oil.

In brief, MUFAs selected from the group composed of palmitoleic acid (C16:1) and its positional isomers, myristoleic (tetradecenoic) acid (C14:1) and its positional isomers and lauroleic (dodecenoic) acid (C12:1), or their mixtures, whether as free acids, salts or esters thereof, are known to provide improvements in the metabolic processing of lipids. However, natural sources for such MUFAs, such as macadamia nut oil, are in limited supply. In order to satisfy the demands for MUFAs, especially to provide new sources for such MUFA compositions, improved methods are needed.

SUMMARY OF THE INVENTION

This invention is directed to a method of making a natural lipid composition enriched in C14:1 monounsaturated fatty acid. According to the method, isolated lower limbs of cattle, when heated to a temperature to liquify the fat contained therein, will yield a natural lipid composition enriched in C14:1 monounsaturated fatty acid.

According to one preferred method, the isolated lower limbs of cattle, when cut or ground into pieces and boiled in the presence of water, produce a multi-phase liquid of water and oil. Separation of the oil phase from the multi-phase liquid provides a natural oil source which has been found to be enriched in C14:1 monounsaturated fatty acid. The term "isolated lower limbs", as used herein, means limbs of cattle which have been severed above the knee (carpal or tarsal joint) and extend to the hoof, or parts of such limbs. These limbs of cattle are usually of little or no value in commercial slaughter houses. Thus, this invention provides a very useful source of natural lipid compositions in C14:1 and C16:1 MUFAs from an otherwise essentially waste material.

Alternatively, when the isolated lower limbs are heated to an elevated temperature, for example, above about 220° F., the fat melts and the liquid oil can be recovered which is enriched in C14:1 MUFA. This method can be practiced in the absence of added water to collect the desired lipid composition.

Surprisingly, concentrations of C14:1 greater than about 1% of the fatty acids in the isolated lipid composition have been produced. The lipid composition also contains C16:1 monounsaturated fatty acids. The isolated natural lipid composition also contains a beneficial ratio of the C14:1 monounsaturated fatty acid to the C16:1 monounsaturated fatty acid in the range of about 1:4 to about 1:6. The concentration of the combined C14:1 and C16:1 monounsaturated fatty acids is at least about 7% of the fatty acids in the lipid composition. Advantageously, the lipid composition contains less than about 10% of C18 saturated fatty acid and has a titer well below 37° C., for example, below about 32° C.

Novel lipid compositions are produced by the method of this invention. These compositions provide a number of advantages. For example, the content of the MUFAs in the composition are increased with a significant decrease of saturated fatty acids. An increase of the ratio of the unsaturated to the saturated fatty acids is also provided. The significant decrease in titer to a temperature of below about 32° C., or less, offers a significant advantage for an all natural product. This titer is well below human body temperature and thus facilitates metabolic processing of lipids and avoids unwanted lipid deposits.

Other benefits and advantages of this invention will be further understood with reference to the following detailed description and examples.

DETAILED DESCRIPTION

EXAMPLE 1

According to this Example, lower limbs of steers from just above the knee to the hoof, with some skin, were obtained. The lower limbs were cut or ground into pieces of up to about about several inches in dimension and placed in a container with boiling water covering the limbs for about 5–6 hours. After rendering the limbs in the boiling water, the water was permitted to cool to a warm state of about 140–150° F. The warm multi-phase liquid of water and oil resulting from the process was separated and washed in separatory funnels to isolate the oil phase. Other separatory means such as centrifuging may be employed to obtain a cleaner separation of the lipid composition. However, no distillations or cold fractionations are needed to produce a satisfactory product.

The natural lipid composition of this example was then analyzed for the content of fatty acids. In the following TABLE 1, analyses of Example 1 fatty acids are provided. In particular, it was found that a C14:1 fatty acid was concentrated in an amount of 1.27% by weight of the total lipid composition. Furthermore, the composition contained 7.60% by weight of C16:1. As further reported in the Table, total MUFAs on the order of about 65.68% by weight, total saturated fatty acids of 23.86% by weight with total polyunsaturated fatty acids of about 3.82% by weight were obtained. The composition of Example 1 thus advantageously provided a unique lipid composition having a C14:1 monounsaturated fatty acid concentration greater than about 1% of fatty acids and a ratio of C16:1 to C14:1 of about 5.9 to 1. In TABLES 1 and 2, "SATFA" means saturated fatty acid, "PUFA" means polyunsaturated fatty acid, "UNSAT" means unsaturated fatty acid, and "SAT" means saturated fatty acid.

TABLE 1

| Fatty Acid | EXAMPLES (% by weight fatty acid) | | | | | |
| --- | --- | --- | --- | --- | --- | --- |
| | 1 | 2 | 3 | 4 | 5 | 6 |
| C12:0 | nil | 0.11 | nil | nil | nil | nil |
| C12:1 | nil | nil | nil | nil | nil | nil |
| C14:0 | 1.41 | 2.31 | 1.29 | 2.17 | 1.75 | 1.78 |
| C14:1 | 1.27 | 1.33 | 0.89 | 1.17 | 1.03 | 1.03 |
| C15:0 | 0.55 | 0.53 | 0.89 | 0.49 | 0.37 | 0.37 |
| C15:1 | nil | nil | 0.25 | nil | nil | nil |
| C16:0 | 16.50 | 18.90 | 16.20 | 20.00 | 17.00 | 17.20 |
| C16:1 | 7.60 | 6.11 | 6.03 | 5.97 | 6.25 | 6.23 |
| C17:0 | 0.69 | 0.85 | 0.52 | 0.84 | 0.71 | 0.72 |
| C17:1 | 1.59 | 1.42 | nil | 1.32 | 1.40 | 1.40 |
| C18:0 | 4.59 | 6.28 | 4.91 | 6.21 | 5.42 | 5.49 |
| C18:1 | 54.70 | 53.00 | 60.40 | 53.10 | 57.60 | 57.40 |
| C18:2 | 2.60 | 3.07 | 2.64 | 2.68 | 3.49 | 3.44 |
| C18:3 | 0.58 | 0.48 | 0.37 | 0.43 | 0.42 | 0.41 |
| C19:0 | nil | nil | nil | nil | nil | nil |
| C20:0 | 0.12 | nil | nil | nil | nil | nil |
| C20:1 | 0.52 | nil | nil | nil | 0.52 | 0.52 |
| C22:0 | nil | nil | nil | nil | nil | nil |
| C22:1 | nil | nil | nil | nil | nil | nil |
| C22:5 | 0.49 | 0.12 | Nil | nil | nil | nil |
| TOTAL MUFA (%) | 65.68 | 61.80 | 65.57 | 62.05 | 66.80 | 66.58 |
| TOTAL SATFA (%) | 23.86 | 28.98 | 23.81 | 29.22 | 24.61 | 25.56 |
| TOTAL PUFA (%) | 3.82 | 3.67 | 4.45 | 3.11 | 3.91 | 3.85 |
| UNKNOWN (%) | 6.25 | 5.12 | 4.92 | 5.24 | 4.00 | 3.88 |
| RATIO UNSAT/SAT | 2.75 | 2.13 | 2.84 | 2.13 | 2.71 | 2.60 |
| TITER ° C. | | 31.8° | | | | |
| RATIO OF C16:1 to C14:1 | 5.9/1 | 4.5/1 | 6.6/1 | 5.9/1 | 6.1/1 | 6.0/1 |

EXAMPLE 2

The procedure of Example 1 was repeated except that the lower limbs consisted of the front lower limbs of steers. Again, the lower limb was taken from just above the knee of the animal to the hoof. After performing the method in a manner similar to that described in Example 1, the separated natural lipid composition was analyzed for fatty acids. The results are reported in Table 1. The composition of Example 2 was quite similar to the composition of Example 1, as reported in the Table. Furthermore, the titer was found to be about 31.8° C. This low titer is very advantageous as it enables very efficient metabolic processing by the animal body in order to obtain advantages such as those set forth in U.S. Pat. No. 5,198,250.

EXAMPLES 3–5

In these Examples, rear limbs of steers, with the hair partially shaved with sodium hydroxide (Example 3), extracted marrow of the lower limbs (Example 4), and another example of commercial lower limbs (Example 5) were treated in the same fashion as in Examples 1–2. Again, remarkable compositional consistency of the fatty acids in the lipid compositions were obtained by Examples 3–5 upon comparison with Examples 1–2. The slightly lower lipid content of C14:1 to about 0.89% was probably attributable to the slight hydrolysis of the lipid composition by the use of sodium hydroxide to shave the hair from the legs. Nevertheless, the method made a composition containing C14:1 of about 1% by weight with 6.03% by weight of C16:1 and compositional uniformity in other respects upon comparison with the other Examples.

EXAMPLE 6

In order to demonstrate compositional consistency even in the wash water phase of the method, minor amounts of the oil were obtained from the wash water of Example 5 and, with reference to TABLE 1, remarkable compositional consistency between Examples 5 and 6 was obtained.

For comparison with Examples 1–6 of this invention, the following TABLE 2 is provided which sets forth the fatty acid content of a number of natural sources of fatty acid compositions. Examples 7–11 set forth, respectively, fatty acid analyses for olive oil, macadamia nut oil, ox tail, natural tallow, and chicken fat. Thus, by comparison with olive oil (Example 7), the lipid compositions of this invention are very advantageous in providing the essential MUFAs to provide beneficial metabolic processing. In comparison to macadamia nut oil (Example 8), the MUFAs of this invention offer a comparably equivalent source of natural lipid compositions high in C14:1 and C16:1 with a comparable low source of saturated C18 and low higher fatty acids. In contrast, ox tail, natural tallow, or chicken fat (Examples 9, 10 and 11 respectively) do not provide the same advantageous benefits as the lipid composition of this invention. These compositions, as sources for lipid, are deficient either in C14:1 fatty acid total monounsaturated fatty acids, titer, or other desirable properties.

TABLE 2

| Fatty Acid | COMPARATIVE EXAMPLES (% by weight fatty acid) | | | | |
| --- | --- | --- | --- | --- | --- |
| | 7 | 8 | 9 | 10 | 11 |
| C12:0 | nil | nil | nit | nil | nil |
| C12:1 | nil | nil | nil | nil | nil |
| C14:0 | nil | 0.81 | 2.92 | 2.97 | 0.59 |
| C14:1 | nil | nil | 0.99 | 0.53 | 0.15 |
| C15:0 | | nil | nil | 0.52 | nil |
| C15:1 | | nil | nil | nil | nil |
| C16:0 | 13. | 8.47 | 23.70 | 23.60 | 25.20 |
| C16:1 | 0.9 | 19.40 | 4.24 | 2.71 | 5.39 |
| C17:0 | nil | nil | 1.08 | 1.50 | 0.13 |
| C17:1 | nil | nil | 1.01 | 0.85 | nil |
| C18:0 | 2.3 | 2.73 | 12.30 | 18.50 | 7.37 |
| C18:1 | 78. | 58.20 | 47.40 | 42.20 | 43.10 |
| C18:2 | 7. | 2.51 | 2.91 | 2.91 | 15.90 |
| C18:3 | 0.7 | 0.20 | 0.23 | 0.30 | 0.84 |
| C19:0 | nil | nil | nil | 0.11 | nil |
| C20:0 | 0.4 | 2.52 | 0.36 | 0.14 | nil |
| C20:1 | trace | 2.92 | 0.36 | 0.34 | 0.40 |
| C22:0 | nil | 0.87 | nil | nil | nil |
| C22:1 | nil | 0.30 | nil | nil | nil |
| C22:5 | | nil | nil | nil | nil |
| TOTAL MUFA (%) | 86. | 80.82 | 54.00 | 46.63 | 41.04 |
| TOTAL SAT FA (%) | 15. | 15.92 | 40.81 | 47.34 | 33.29 |
| TOTAL PUFA (%) | 7.5 | 3.01 | 3.14 | 3.21 | 17.04 |
| UNKNOWN | 3. | 0.57 | 1.88 | 2.59 | 0.26 |

TABLE 2-continued

| | COMPARATIVE EXAMPLES (% by weight fatty acid) | | | | |
|---|---|---|---|---|---|
| Fatty Acid | 7 | 8 | 9 | 10 | 11 |
| (%) RATIO UNSAT/SAT | 5.26 | 5.08 | 1.33 | 0.985 | 1.98 |
| TITER ° C. | 21° | 23.2° | | 42.0° | 35.6° |
| RATIO OF C16:1 to C14:1 | X | 400/1 | 4.5/1 | 5.1/1 | 36/1 |

EXAMPLE 7

In an alternative embodiment of the invention, as mentioned above, when the isolated lower limbs are heated to an elevated temperature, for example, about 220° F., the fat melts and the liquid oil can be recovered which is enriched in C14:1 MUFA. In this "dry" rendering method, the temperature may rise to about 300° F. and the liquid oil removed from the isolated limbs, with any necessary centrifuging or filtration, as an alternative method for producing the desired lipid composition.

In view of the above detailed description, it will become apparent to those of ordinary skill in the art that other variations of the method may be made without departing from the spirit and scope of this invention.

What is claimed is:

1. A method of making a natural lipid composition enriched in C14:1 monounsaturated fatty acid comprising
   heating isolated lower limbs of cattle to liquify the fat contained therein to produce an oil,
   Recovering the oil to provide a natural lipid composition enriched in C14:1 monounsaturated fatty acid.

2. The method of claim 1 wherein the heating is conducted in the presence of an effective amount of water to produce a multi phase liquid of water and oil, and
   separating the oil from the water of the multi-phase liquid to provide a natural lipid composition enriched in C14:1 monounsaturated fatty acid.

3. The method of claim 2 wherein the water is heated to about 212° F. and the oil phase is separated at a lower temperature.

4. The method of claim 2 wherein the lower temperature separation is on the order of about 140° F. to about 150° F.

5. The method of claim 2 wherein the lower limbs are reduced into pieces prior to heating.

6. The method of claim 2 wherein the isolated lower limb consists essentially of the marrow thereof.

7. The method of claim 2 wherein the concentration of the C14:1 is at least about 1% of the fatty acids in said lipid composition.

8. The method of claim 2 wherein said natural lipid composition contains C16:1 monounsaturated fatty acid.

9. The method of claim 2 wherein the ratio of the C14:1 monounsaturated fatty acid to the C16:1 monounsaturated fatty acid is in the range of about 1:4 to about 1:6.

10. The method of claim 2 wherein the concentration of the combined C14:1 and C16:1 monounsaturated fatty acids is at least about 7% by weight of the fatty acids in said lipid composition.

11. The method of claim 2 wherein the lipid composition contains less than about 10% by weight of C18 saturated acid and has a titer below about 32° C.

12. The method of claim 1 wherein the lower limbs are heated to a temperature of at least about 220° F.

13. Lipid compositions produced by the method of any of claim 1, 2, 3, 4, 5, 6, 7, 8, 9, 10, 11 or 12.

* * * * *